(12) United States Patent
Sheaffer et al.

(10) Patent No.: US 10,848,889 B2
(45) Date of Patent: *Nov. 24, 2020

(54) INTELLIGENT AUDIO RENDERING FOR VIDEO RECORDING

(71) Applicant: Apple Inc., Cupertino, CA (US)

(72) Inventors: Jonathan D. Sheaffer, Santa Clara, CA (US); Joshua D. Atkins, Los Angeles, CA (US); Martin E. Johnson, Los Gatos, CA (US); Stuart J. Wood, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 16/240,161

(22) Filed: Jan. 4, 2019

(65) Prior Publication Data

US 2019/0222950 A1   Jul. 18, 2019

Related U.S. Application Data

(63) Continuation of application No. 15/639,191, filed on Jun. 30, 2017, now Pat. No. 10,178,490.

(51) Int. Cl.
*H04R 5/00* (2006.01)
*H04S 7/00* (2006.01)
*G10L 19/008* (2013.01)
*G06T 7/20* (2017.01)
*G10L 21/0272* (2013.01)
(Continued)

(52) U.S. Cl.
CPC .................. *H04S 7/30* (2013.01); *G06T 7/20* (2013.01); *G10L 19/008* (2013.01); *H04S 7/302* (2013.01); *G10L 21/0272* (2013.01); *G10L 2021/02082* (2013.01); *G10L 2021/02166* (2013.01);
(Continued)

(58) Field of Classification Search
CPC .......................................................... H04R 5/00
See application file for complete search history.

(56) References Cited

U.S. PATENT DOCUMENTS 8,150,063 B2   4/2012   Chen et al.
8,319,858 B2   11/2012  Zhang et al.
(Continued)

FOREIGN PATENT DOCUMENTS

WO   WO-2014130221   8/2014

OTHER PUBLICATIONS

Evangelista, G., et al., "Sound Source Separation", *U. Zolzer (ed.), DAFX: Digital Audio Effects*, 2nd Edition, (Mar. 1, 2011), 42 pages.

*Primary Examiner* — Olisa Anwah
(74) *Attorney, Agent, or Firm* — Womble Bond Dickinson (US) LLP

(57) ABSTRACT

Image analysis of a video signal is performed to produce first metadata, and audio analysis of a multi-channel sound track associated with the video signal is performed to produce second metadata. A number of time segments of the sound track are processed, wherein each time segment is processed by either (i) spatial filtering of the audio signals or (ii) spatial rendering of the audio signals, not both, wherein for each time segment a decision was made to select between the spatial filtering or the spatial rendering, in accordance with the first and second metadata. A mix of the processed sound track and the video signal is generated. Other embodiments are also described and claimed.

20 Claims, 4 Drawing Sheets

(51) Int. Cl.
  *G10L 21/0216* (2013.01)
  *G10L 21/0208* (2013.01)
  *H04S 3/00* (2006.01)

(52) U.S. Cl.
  CPC .............. *H04S 3/00* (2013.01); *H04S 2400/11* (2013.01); *H04S 2400/15* (2013.01); *H04S 2420/01* (2013.01)

(56) References Cited

U.S. PATENT DOCUMENTS

| | | | |
|---|---|---|---|
| 9,338,420 B2* | 5/2016 | Xiang | G11B 27/031 |
| 2008/0247567 A1* | 10/2008 | Kjolerbakken | H04N 7/142 |
| | | | 381/92 |
| 2010/0123785 A1 | 5/2010 | Chen et al. | |
| 2011/0081024 A1* | 4/2011 | Soulodre | H04S 7/30 |
| | | | 381/17 |
| 2011/0285808 A1* | 11/2011 | Feng | H04N 7/142 |
| | | | 348/14.09 |
| 2012/0163624 A1* | 6/2012 | Hyun | H04R 3/005 |
| | | | 381/92 |
| 2013/0342731 A1* | 12/2013 | Lee | H04N 5/23293 |
| | | | 348/231.4 |
| 2014/0226842 A1* | 8/2014 | Shenoy | H04N 7/147 |
| | | | 381/303 |
| 2014/0278394 A1* | 9/2014 | Bastyr | G10L 21/0208 |
| | | | 704/233 |
| 2014/0348342 A1* | 11/2014 | Laaksonen | H04S 7/30 |
| | | | 381/92 |
| 2015/0022636 A1* | 1/2015 | Savransky | H04R 3/00 |
| | | | 348/46 |
| 2015/0131966 A1 | 5/2015 | Zurek et al. | |
| 2015/0139426 A1* | 5/2015 | Tammi | H04S 7/30 |
| | | | 381/17 |
| 2015/0281839 A1* | 10/2015 | Bar-On | G10L 21/0208 |
| | | | 381/71.7 |
| 2015/0317981 A1* | 11/2015 | Yliaho | H04R 5/027 |
| | | | 381/26 |
| 2015/0332680 A1 | 11/2015 | Crockett | |
| 2015/0350769 A1* | 12/2015 | Sun | G06K 9/00221 |
| | | | 348/14.08 |
| 2015/0365759 A1* | 12/2015 | Dimitriadis | G06K 9/00684 |
| | | | 381/71.1 |
| 2015/0382127 A1* | 12/2015 | Sun | H04S 7/30 |
| | | | 381/17 |
| 2016/0127827 A1 | 5/2016 | Tzirkel-Hancock et al. | |
| 2016/0182799 A1 | 6/2016 | Laaksonen et al. | |
| 2016/0249134 A1* | 8/2016 | Wang | H04R 3/005 |
| 2017/0195591 A1* | 7/2017 | Avadhanam | H04N 5/357 |
| 2017/0195819 A1* | 7/2017 | Harder | H04S 7/40 |
| 2017/0308351 A1* | 10/2017 | Laaksonen | G06F 3/16 |

* cited by examiner

INTELLIGENT AUDIO RENDERING FOR VIDEO RECORDING

FIELD

An embodiment of the invention relates to digital signal processing techniques suitable for implementation in a portable consumer electronics device such as a smartphone or a tablet computer, that automatically determine how best to render the pickup audio of a video recording session to better suit the cinematic intent of a user of the device.

BACKGROUND

Portable consumer electronics devices such as smartphones and tablet computers are used to make video recordings of various types of events. For instance, the recording session may be an interview with a single person, and where the background or ambient sound environment might be either quiet or it might be noisy such as due to wind, an airplane, cars driving by, or babble noise from multiple other talkers. In another instance, the recording may be of a nature scene outdoors.

SUMMARY

An embodiment of the invention is a digital signal processing process also referred to here as an intelligent audio rendering process that may run for example in a portable device such as a smartphone or a tablet computer. Some or all of the process may be running online, while the portable device is capturing audio and video of a scene during a recording session; alternatively, some or all of the process may be performed offline, or after completion of the recording session, and where it may be performed either in the capturing portable device or it may be performed externally in another device. In both instances, the intelligent audio rendering process obtains access to a video recording made by a portable electronic device, where the video recording captures i) motion in a scene as a video signal produced by a camera in the portable electronic device, and ii) sound in the scene as a sound track that has two or more audio signals produced by two or more microphones, respectively, in the portable electronic device. The process automatically adapts or modifies the original, multi-channel pickup audio or captured sound track of the scene, and stores the modified version into a new mix along with the video signal that contains the concurrently captured motion in the scene. In this way, the mix contains a more relevant version of the originally captured multi-channel pickup audio, one that better fits with the cinematic intent of the user who was operating the portable electronic device, without requiring specific manual user input to specify which audio segments of the original recording should be modified, or how they should be modified.

The multi-channel pickup audio can be modified in one of two processing modes. In a spatial filtering mode, the modification creates speaker driver audio signals that are designed to, when played back, focus on a particular one or more sound sources in the scene, while filtering out competing and distracting sounds arriving from other directions. Such a modification may be performed through directional spatial processing of the multi-channel audio pickup, using for example beam forming techniques. By contrast, in a spatial rendering mode, the modification creates the speaker driver audio signals so that they preserve the directional characteristics of the sound scene thereby producing a natural and immersive audio experience for the listener.

The decision as to which modification to perform for a given segment of the sound track may be based on an estimated cinematic intent of the user. To help estimate this intent, there are at least two classifiers or analysis blocks. An audio classifier (audio analysis block) can classify a given segment of the multi-channel sound track in one of several classes, such as speech in quiet, wind, motor noise, speech in babble noise or multi-talker noise, etc. An image classifier (image analysis block) can classify a concurrent segment of the video as a person, a train or other vehicle, a big room, outdoors vs. indoors, etc. These audio and video classifications, also referred to here as metadata associated with the audio-video recording, are provided to a decision maker.

The decision maker decides how the multi-channel pickup audio should be modified or rendered, before it is combined with the video signal into a new mix. In one embodiment, the decision maker compares the current classifications (in the metadata) to prior or predefined categories of the classifications, to find a matching category. The categories may be predefined in several ways. For example, they may be predefined by professional audio engineers, or by average users. The decision on how to render may also be based on other information available during the recording session, e.g., global positioning system (GPS) data, ambient light sensor information, etc.

For example, an audio classification of "speech in multi-talker noise" and a video classification of "a person" could match with a "pickup beam forming" category, meaning that beam forming should be used to render the multi-channel pickup audio (to produce the modified sound track for the mix.) As another example, the matching category could be "sound source separation", meaning that blind source separation should be used to render the multi-channel audio pickup. These examples of the spatial filtering mode would reflect situations where the user of the device wants the recording session to focus on the speech of a particular talker in a multi-talker setting, while at the same time also suppressing other ambient environment sounds.

In one embodiment, the decision making process described above takes place online, or during the recording session itself, but some or all of the actual rendering or modification of the multi-channel pickup audio into the new mix occurs offline, or after the recording session has ended (e.g., after the user has pressed the shutter button to stop the recording.) In that case, the decision maker, using the current classifications (metadata) as inputs, may determine that certain rendering operations that may be so computationally complex (e.g., de-reverberation, noise removal, and source separation) that they should be performed off line.

The intelligent audio rendering process may run continuously during the entirety of the video recording session, to adapt how the captured audio is rendered in accordance with the estimated intent of the user of the portable device (e.g., beam forming is turned on when needed, and off when not needed, during the same recording session.) Alternatively, the process may be performed once initially (e.g., within the first 5 seconds of the recording session) and the resulting audio rendering decisions, such as beam forming settings, can then be kept unchanged for the remainder of the recording session.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, in the interest of conciseness and reducing the total number of figures, a given figure may be used to illustrate the features of more than one embodiment of the invention, and not all elements in the figure may be required for a given embodiment.

DETAILED DESCRIPTION

Several embodiments of the invention with reference to the appended drawings are now explained. Whenever the shapes, relative positions and other aspects of the parts described in the embodiments are not explicitly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

Figure 1:
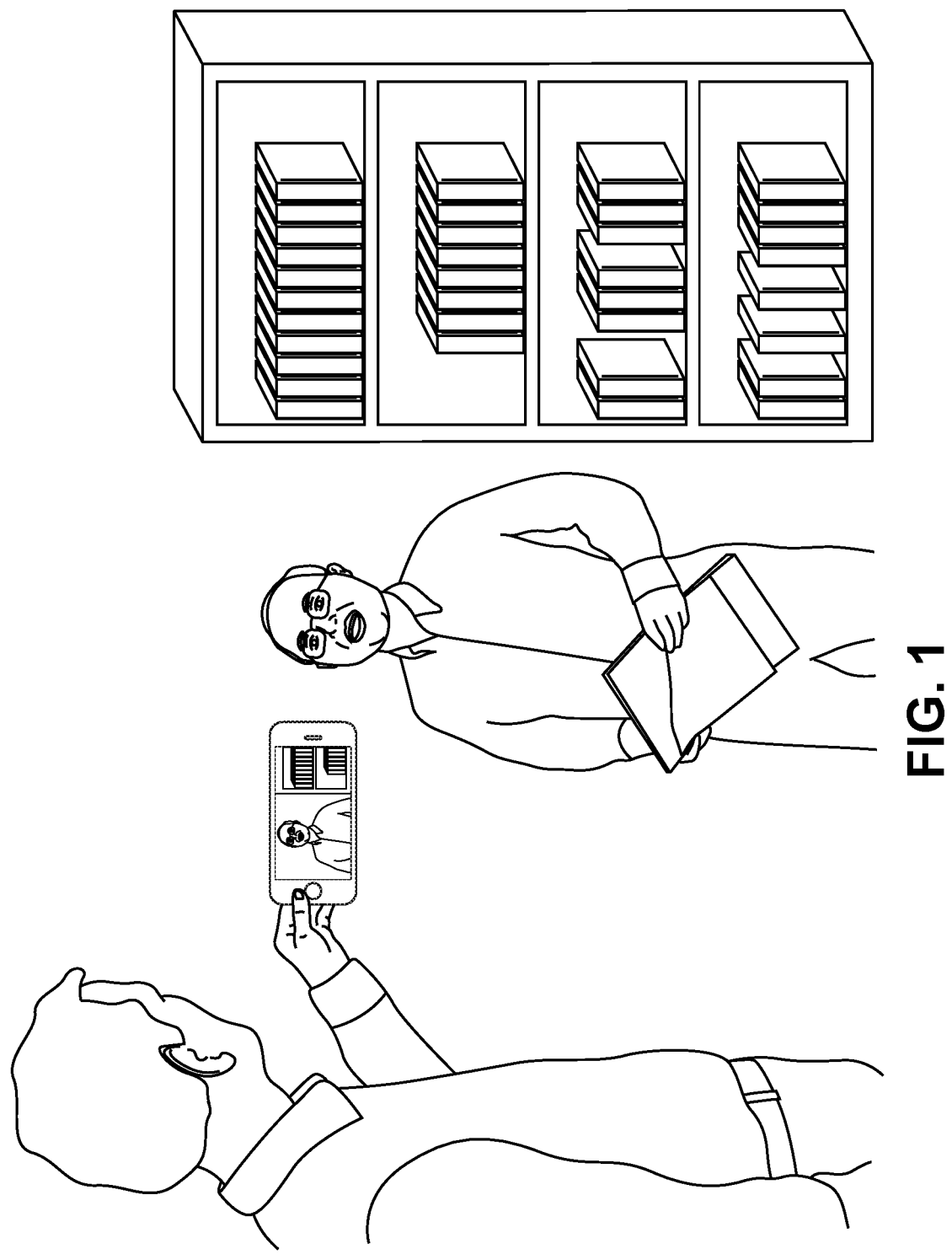
FIG. 1 shows a user focusing her smartphone video camera on a single talker.
Figure 2:
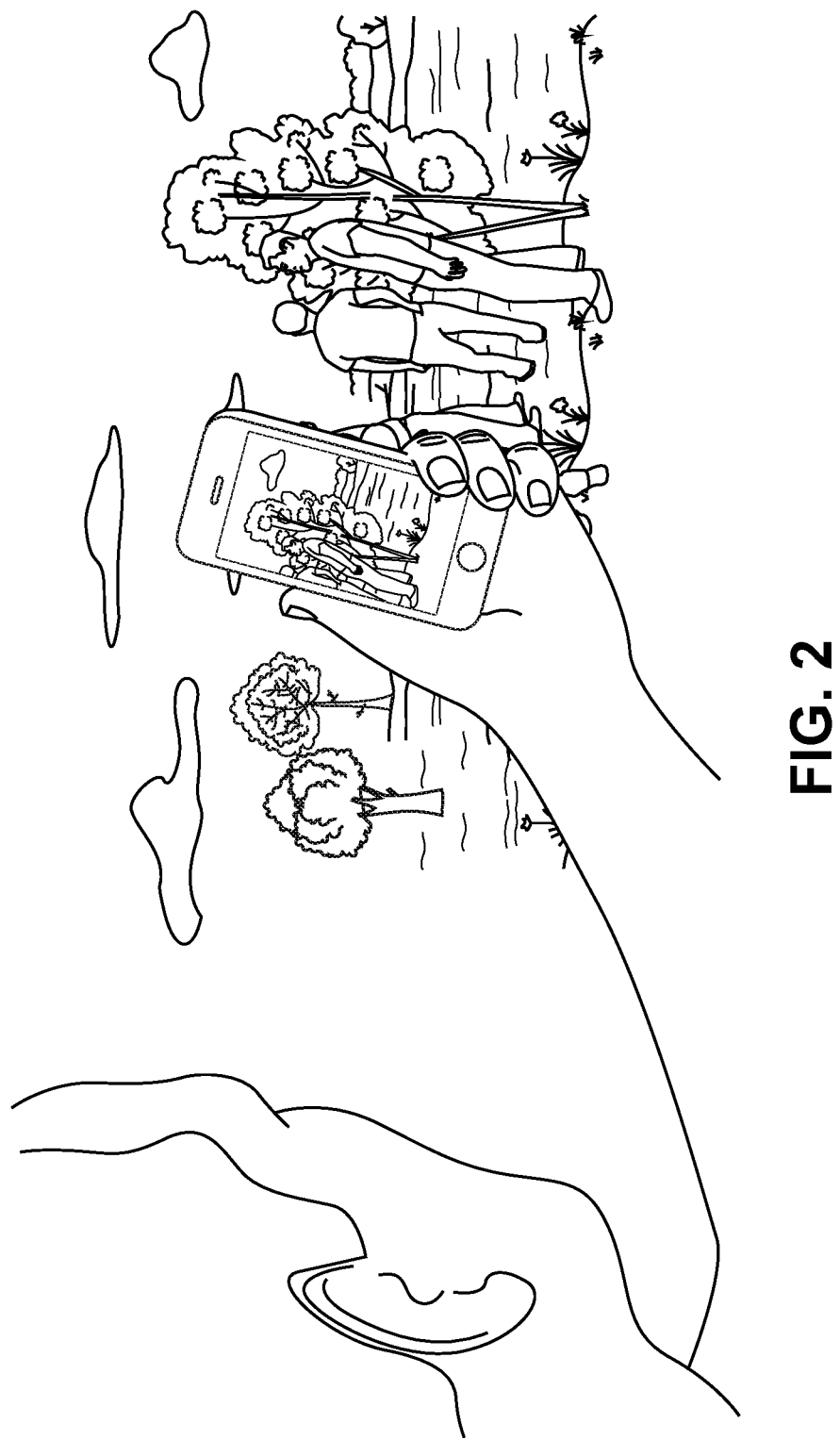
FIG. 2 depicts a user aiming the smartphone video camera at a group of persons while outdoors.

FIG. 1 shows a user holding a smartphone and aiming it a talker. As seen in the viewfinder of the smartphone's camera, the user has elected to zoom in on the talker. FIG. 2 shows another usage scenario of the smartphone, where the user is aiming the camera at a group of persons while outdoors in a park-like setting; note here that the camera viewfinder shows the camera as being zoomed out, to cover a wider shot. This would also be the case for example when shooting a nature scene. These two usage scenarios have different audio rendering needs, for playback (sound output) of the captured sound in each scene. The audio rendering needs can be intelligently and automatically met (without requiring manual input from the user) using the process or algorithm described below. It should be noted that the smartphone is one example of a portable multi-function device that has multiple microphones and a digital video camera built-in; the audio rendering techniques described here may also be implemented in other portable multi-function devices, such as a tablet computer, a camcorder, and a laptop computer.

Figure 3:
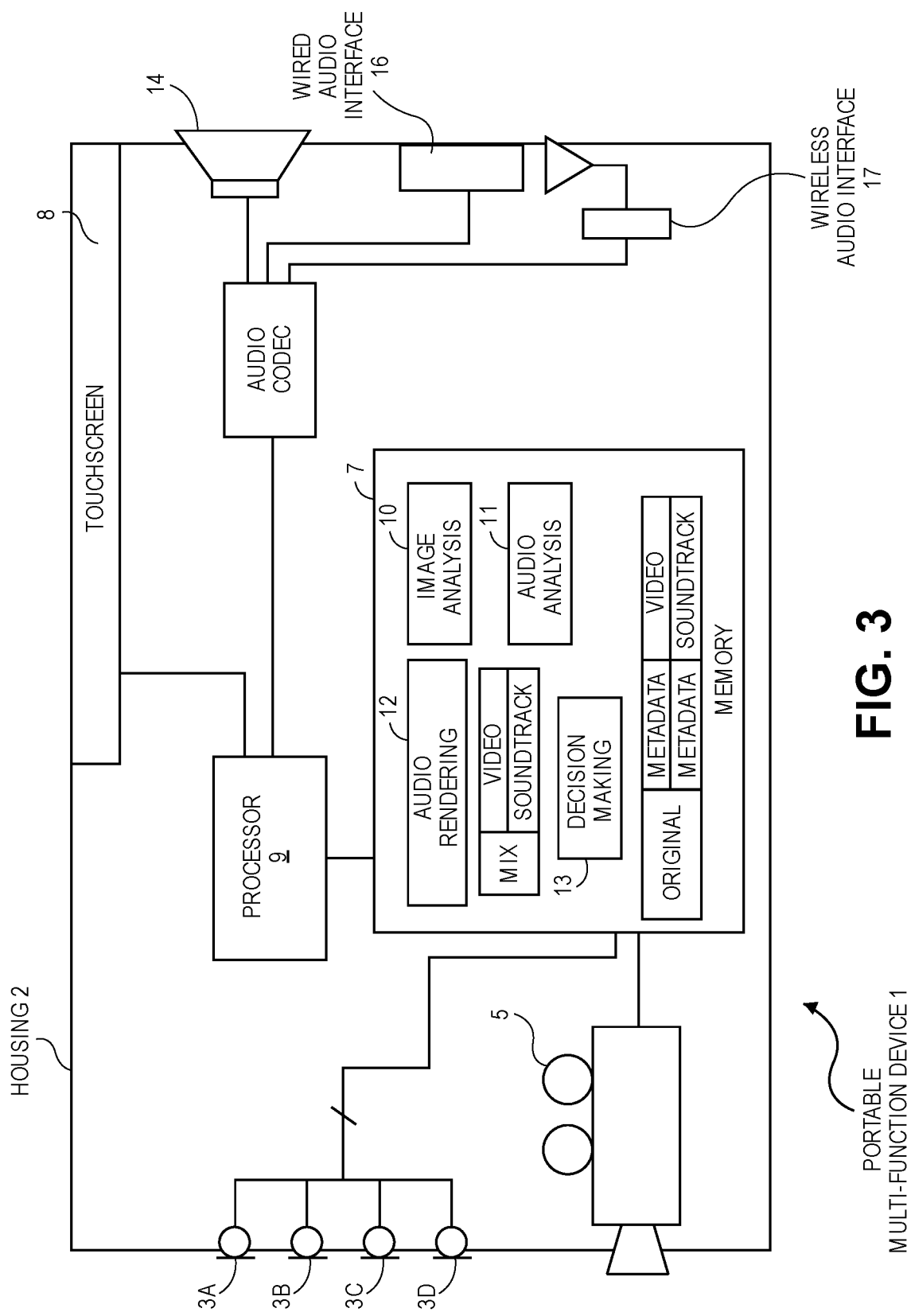
FIG. 3 is a block diagram of relevant components of a portable multi-function device.

FIG. 3 is a block diagram of the relevant electronic components of a portable multi-function device 1 that may participate in or perform an intelligent audio rendering process. The device 1 has an external housing 2 in which are integrated at least two microphones 3a-3b, where in this example there are four microphones 3a-3d. Each may be omnidirectional, located at a different position on the housing 2, and acoustically open to capture the sound in the scene outside of the housing 2. A digital video camera 5 is also integrated in the housing and may be aimed at the scene by a user of the device 1 (as for example depicted in FIG. 1 and in FIG. 2.) An audio-video (video) recording session may begin in response to a request from a user who is operating the device 1, triggered for example by the user toggling a physical or virtual shutter button of the device 1 (which may also encompass short phrase detection of a voice trigger spoken by the user.) Motion in the scene then starts to be captured, as a video signal produced by the camera 5 and stored in a memory 7 of the device 1, simultaneously with sound in the scene being captured as a sound track that contains two or more audio signals, also referred to as multi-channel pickup audio, produced by the microphones 3, respectively. During the recording session, the video signal may be displayed in a display screen 8 (e.g., a touchscreen) that is integrated in the housing 2, using electronic viewfinder functionality in the device 1. Note that the digital processing aspects of the video camera 5, including exposure control and viewfinder, may be performed by a processor 9 executing a camera application program (not shown) stored in the memory 7.

The intelligent audio rendering process continues with the processor 9 performing image analysis of the video signal. Note that the entirely of this process may be performed "online", or concurrently during the recording session, but it could also be performed "offline" or after the recording session has ended. The process is performed by the processor 9 executing image analysis instructions stored in the memory 7 (image analysis 10) to produce first metadata. In addition, there may also be online audio analysis of the sound track by the processor 9 executing audio analysis instructions stored in the memory 7 (audio analysis 11) to produce second metadata. The first metadata describes certain characteristics or content of the video signal and in particular the types of objects in the scene that are being detected in corresponding segments of the video signal, such as a single person, multiple persons, outdoors vs. indoors, moving vehicles, etc. They may be the result of processing the video signal by an image classifier that (i) detects image features within the scene and (ii) generates the first metadata as describing the detected image features. The image classifier (image analysis block) can classify a given one or more consecutive segments of the video as depicting a person, a train or other vehicle, a big room, outdoors vs. indoors, etc.

The second metadata describes certain characteristics or content of the audio signal and in particular the types of sound sources in the scene that are being detected in corresponding segments of the audio signals. They may be the result of processing the multi-channel pickup audio by an audio classifier that (i) detects acoustic features in the scene and (ii) generates the second metadata as describing the detected acoustic features. The audio classifier (audio analysis block) can classify a given one or more consecutive segments of the multi-channel sound track as speech in quiet, wind, motor noise, speech in babble noise or multi-talker noise, etc.

The first and second metadata are used by a decision maker, in the form of the processor 9 executing decision making instructions stored in the memory 7 (decision making 13), to determine how to configure an audio rendering process, as between a spatial filtering mode and a spatial rendering mode. For each time segment, a decision is made as to how to modify the multi-channel pickup audio, between spatial filtering or spatial rendering, not both, in accordance with the first and second metadata. It should also be noted that the decision on how to render the multi-channel pickup audio may also be based on other information available during the recording session, e.g., global positioning system (GPS) data, ambient light sensor information, etc. The decision may be made by comparing (i) a combination of one or more of the detected image features and one or more of the detected acoustic features (a "current classification"), with (ii) predefined image features and predefined acoustic features, in order to categorize the combination. Either the spatial filtering or the spatial rendering is then selected, based on a particular category that matches the current classification.

In one embodiment, the decision maker compares the current classification to prior or predefined categories of classifications, to find a matching category. For example, an audio classification of "speech in multi-talker noise" and a video classification of "a person" for a given segment could match with a "pickup beam forming" category, meaning that beam forming should be used to render the multi-channel audio pickup (to produce the modified sound track for the mix.) In one embodiment, the decision is made to perform spatial filtering in response to the first and second metadata indicating detected speech and a detected face, respectively, for the same time segment. As another example, the matching category could be "sound source separation", when the current classifications are "speech in multi-talker noise" and "a person" so that blind source separation will be used to render the multi-channel audio pickup. These examples of the spatial filtering mode reflect situations where the user of the device wants the recording session to focus on the speech of a particular talker in a multi-talker setting, while at the same time also suppressing other ambient environment sounds—see FIG. 1. For instance, whenever the decision has been made to perform spatial filtering, then it should be expected there is a single dominant sound source in the scene that may be surrounded by distracters or by ambient noise, e.g., focusing on a single talker where the ambient or background sound is babble at a party or other noise.

In another embodiment, the decision making 13 and the audio analysis 11 together implement a machine learning algorithm that has been trained with audio content that has been labeled by expert listeners, so as to recognize similar audio content in the original sound track and in response generate a current classification that is defined by the labels that have been given to the algorithm by the expert listeners.

Figure 4:
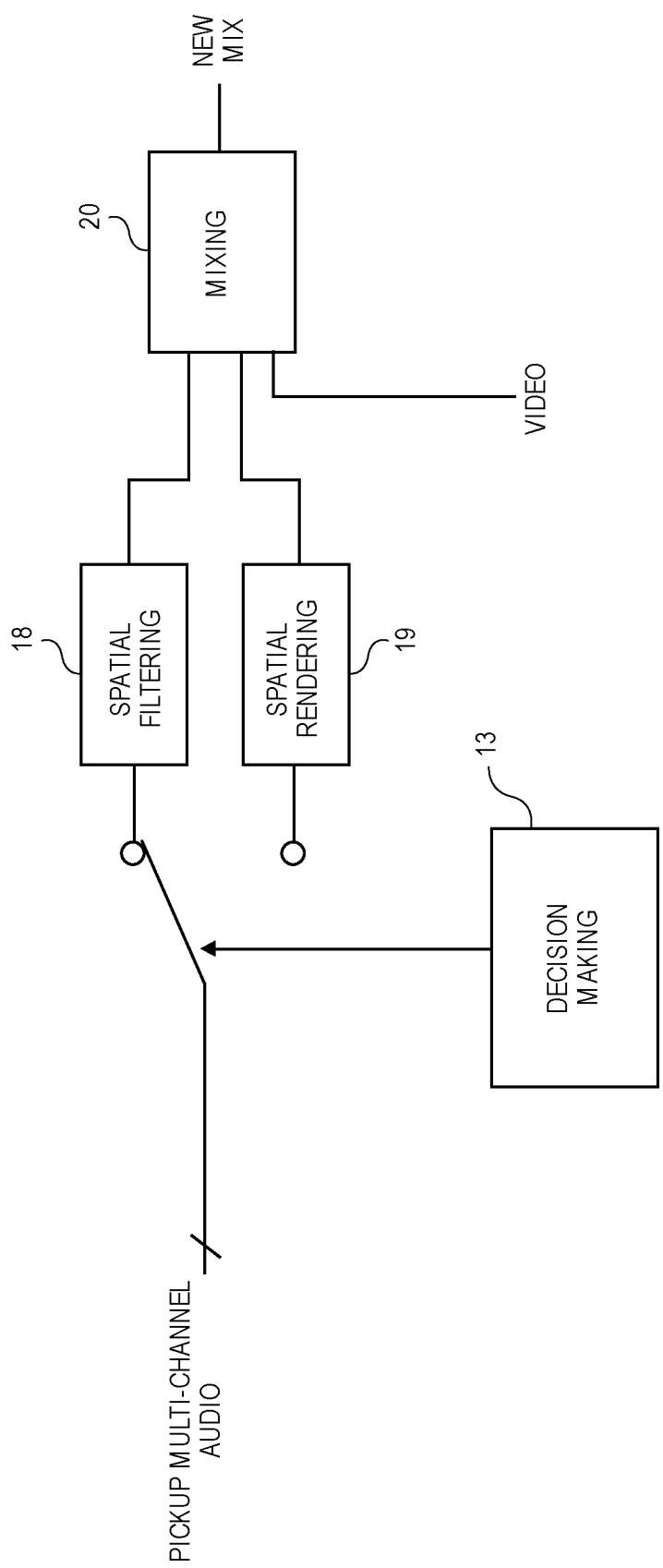
FIG. 4 depicts the decision making, audio modification (rendering) and mixing operations.

The decision making, audio rendering and mixing operations are also depicted in FIG. 4. The audio rendering includes spatial filtering where the processor performs spatial filtering instructions stored in the memory 7 (spatial filtering 18) and spatial rendering (the processor 9 performs the spatial rendering instructions stored in the memory 7 (spatial rendering 19), where in one embodiment only or the other, not both, is performed upon a given audio segment. Both of the operations produce digital sound output transducer (speaker) driver audio signals, derived from the multi-channel pickup audio (multi-channel sound track). The overall process may be as follows: a number of time segments of the multi-channel sound track, e.g., a sequence of 50-100 millisecond chunks or frames of the audio signals (multi-channel pickup audio) that span at least a portion of, e.g., the entire recording session, are processed; each time segment is processed by either (i) spatial filtering of the multi-channel pickup audio or (ii) spatial rendering of the multi-channel pickup audio, not both, as per a decision that was made by the decision making 13, in accordance with the first and second metadata. The process then continues with the processor 9 executing the mixing instructions that are stored in the memory 7 (mixing 20) to produce a new, audio-visual mix of the processed sound track and the video signal, wherein the new mix may be stored in the memory 7 of the device 1. Once the recording session has ended, the intelligent audio rendering process has finished producing the new mix, the mix may be played back (output) to the user, e.g., through the local display screen 8 and a loudspeaker 14, wherein the latter represents two or more sound output transducers that may be built-into the housing 2. Alternatively, the audio portion (soundtrack) of the mix may be routed out of the device 1 for output through external sound output transducers (not shown), through a wired audio interface 16 (e.g., a Universal Serial Bus port) or through a wireless audio interface 17 (e.g., a Bluetooth or Wifi transceiver.) The mix, by virtue of the decisions made as between spatial filtering and spatial rendering, better reflects the estimated cinematic intent of the user during the recording session.

As mentioned above, the digital signal processing (modification) of a given time segment of the multi-channel pickup audio can be done in one of two modes. In the spatial filtering mode, the spatial filtering 18 may process the multi-channel pick up audio to result in speaker driver audio signals that focus on sound from a single direction in space. This effectively results in sound from other directions being filtered out, using for example one or more of dereverberation, source separation or beamforming algorithms. In effect, this suppresses undesired ambient sound that is in the multi-channel pickup audio. In one embodiment, the sound from the single direction is rendered monophonically in the processed sound track, or constrained to a single audio channel. In another embodiment, the sound from the single direction is rendered as a number of speaker driver audio signals that define a direct content beam pattern that is expected to point at a listening position (for the case where the speaker drive audio signals are intended to drive a loudspeaker array.) An example where this mode should be selected is shown in FIG. 1.

In the spatial rendering mode, the spatial rendering 19 may process the multi-channel pick up audio to result in speaker driver audio signals in which the sounds in the scene that originate from several directions in space have been retained (including the sense of direction for each of those sounds.) The sounds may be rendered (digitally processed) for playback, using for example binaural techniques which attempt to reproduce the sounds at their respective directions or positions in space via playback through the left and earphones of a headset. The sounds may alternatively be rendered for playback through multiple, distinct loudspeaker cabinets that are positioned at different locations in a room, e.g., a dedicated home audio entertainment surround sound system, or a distributed, networked sound system that includes multiple, portable loudspeaker cabinets. Loudspeaker panning techniques may be used in that case to virtually position or move the sounds to their respective directions or positions in space. The spatial rendering mode thus results in a natural and immersive audio experience for the listener, and may also be described as a virtual sound representation of the sound in the scene. For example, in one embodiment, whenever the decision is made to select spatial rendering mode, the entirety of a soundscape in the scene is captured in the mix. An example of where this mode is suitable is shown in FIG. 2, and in other instances where a group scene or an outdoors or nature scene being captured.

An embodiment of the invention is a method for intelligently rendering audio, the method comprising: in response to a request from a user who is operating a portable electronic device, capturing, by the device, i) motion in a scene as a video signal produced by a digital camera in the device, and ii) sound in the scene as a multi-channel sound track that comprises a plurality of audio signals produced by a plurality of microphones, respectively, in the device; performing, by the device, image analysis of the video signal and audio analysis of the sound track; processing the sound track in the device, by switching between spatial filtering processing and spatial rendering processing of the plurality of audio signals based on the image analysis and based on the audio analysis, to produce a processed sound track in which there are i) a plurality of time segments that have been spatially filtered and ii) a plurality of other time segments having a virtual sound representation of the sound in the scene; and generating in the device a mix of the video signal and the processed sound track.

As explained above, an embodiment of the invention may be a non-transitory machine-readable medium (such as microelectronic memory) having stored thereon instructions, which program one or more data processing components (generically referred to here as a "processor") to perform the digital signal processing operations described above including audio analysis, image analysis, decision making and audio rendering. In other embodiments, some of these operations (of a machine process) might be performed by specific electronic hardware components that contain hardwired logic (e.g., dedicated digital filter blocks). Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For instance, in the case where the intelligent audio rendering process is performed offline, the process may be performed outside of the portable device whose camera and microphones captured the scene in the recording session, for example by a desktop or laptop computer or even by a remote server to which the original video and soundtrack have been transferred from the recording device. Note also that, especially in an offline implementation, the spatial filtering 18 and the spatial rendering 19 (part of the audio rendering 12) may be tailored to a particular sound reproduction system, e.g., a headset vs. a distributed network of loudspeaker cabinets in a room. The description is thus to be regarded as illustrative instead of limiting.

What is claimed is:

1. A method for intelligently rendering audio for a video recording, the method comprising:
   accessing a video recording, wherein the video recording is produced by a portable electronic device and captures i) motion in a scene as a video signal produced by a camera in the portable electronic device, and ii) sound in the scene as a sound track that comprises a plurality of audio signals produced by a plurality of microphones, respectively, in the portable electronic device;
   performing image analysis of the video signal to produce first metadata, and audio analysis of the sound track to produce second metadata;
   processing a plurality of time segments of the sound track, wherein each time segment is processed by either (i) spatial filtering of the audio signals or (ii) spatial rendering of the audio signals, based on a decision made in accordance with the first and second metadata; and
   generating a mix of the processed sound track and the video signal.

2. The method of claim 1 wherein performing the image analysis comprises processing the video signal by an image classifier that (i) detects image features within the scene and (ii) generates the first metadata that describes the detected image features, and
   wherein performing the audio analysis comprises processing the plurality of audio signals by an audio classifier that (i) detects acoustic features in the scene and (ii) generates the second metadata that describes the detected acoustic features.

3. The method of claim 2 wherein the decision as between spatial filtering and spatial rendering is made by
   comparing (i) a combination of the image features and the acoustic features with (ii) predefined image features and predefined acoustic features, in order to categorize the combination; and
   selecting either the spatial filtering or the spatial rendering based on a particular category that matches the combination of the image features and acoustic features.

4. The method of claim 1 wherein the spatial filtering of the audio signals comprises
   focusing on sound from a single direction in space wherein sound from other directions are filtered out, using one of dereverberation, source separation or beamforming.

5. The method of claim 4 wherein the sound from the single direction is rendered monophonically in the processed sound track.

6. The method of claim 4 wherein the decision is made to perform spatial filtering whenever there is a single dominant sound source in the scene that is surrounded by distracters or by ambient noise.

7. The method of claim 1 wherein the spatial rendering of the audio signals comprises
   retaining sounds from a plurality of directions in space, and rendering them, either using binaural techniques or loudspeaker panning techniques, at their respective directions or positions in space.

8. The method of claim 7 wherein whenever the decision is made to perform spatial rendering, the entirety of a soundscape in the scene is being captured.

9. The method of claim 1 wherein the decision is made to perform spatial filtering in response to the first and second metadata indicating detected speech and a detected face in a same time segment.

10. The method of claim 1 wherein the decision is made in accordance with a machine learning algorithm that has been trained with audio content that has been labeled by expert listeners.

11. A portable electronic device for intelligently rendering audio for a video recording made by the device, the portable electronic device comprising:
    a plurality of microphones configured to capture sound in a scene as a sound track having a plurality of audio signals produced by the plurality of microphones, respectively;
    a video camera configured to capture motion in a scene as a video signal;
    a processor; and
    memory having stored therein instructions that when executed by the processor perform image analysis of the video signal to produce first metadata and audio analysis of the sound track to produce second metadata, process a plurality of time segments of the sound track, wherein each time segment is processed by (i) spatial filtering of the audio signals or (ii) spatial rendering of the audio signals to produce a processed sound track, based on a decision made in accordance with the first and second metadata, and generate a mix of the processed sound track and the video signal.

12. The device of claim 11 wherein performing the image analysis comprises processing the video signal by an image classifier that (i) detects image features within the scene and (ii) generates the first metadata that describes the detected image features, and wherein performing the audio analysis comprises processing the plurality of audio signals by an audio classifier that (i) detects acoustic features in the scene and (ii) generates the second metadata that describes the detected acoustic features.

13. The device of claim 12 wherein the decision as between spatial filtering and spatial rendering is made by comparing (i) a combination of the image features and the acoustic features with (ii) predefined image features and predefined acoustic features, in order to categorize the combination; and selecting either the spatial filtering or the spatial rendering based on a particular category that matches the combination of the image features and acoustic features.

14. The device of claim 11 wherein the spatial filtering of the audio signals comprises focusing on sound from a single direction in space wherein sound from other directions are filtered out, using one of dereverberation, source separation or beamforming.

15. The device of claim 14 wherein the sound from the single direction is rendered monophonically in the processed sound track.

16. The device of claim 14 wherein the decision is made to perform spatial filtering whenever there is a single dominant sound source in the scene that is surrounded by distracters or by ambient noise.

17. The device of claim 11 wherein the spatial rendering of the audio signals comprises retaining sounds from a plurality of directions in space, and rendering them, either using binaural techniques or loudspeaker panning techniques, at their respective directions or positions in space.

18. The device of claim 17 wherein whenever the decision is made to perform spatial rendering, the entirety of a soundscape in the scene is captured.

19. The device of claim 11 wherein the decision is made to perform spatial filtering in response to the first and second metadata indicating detected speech and a detected face in a same time segment.

20. The device of claim 11 wherein the decision is made in accordance with a machine learning algorithm that has been trained with audio content that has been labeled by expert listeners.

* * * * *